Nov. 29, 1927.  
H. C. BEHR  
1,650,685  
PROCESS AND APPARATUS FOR SEPARATING LIQUIDS FROM SOLIDS  
Filed Dec. 12, 1925   3 Sheets-Sheet 3

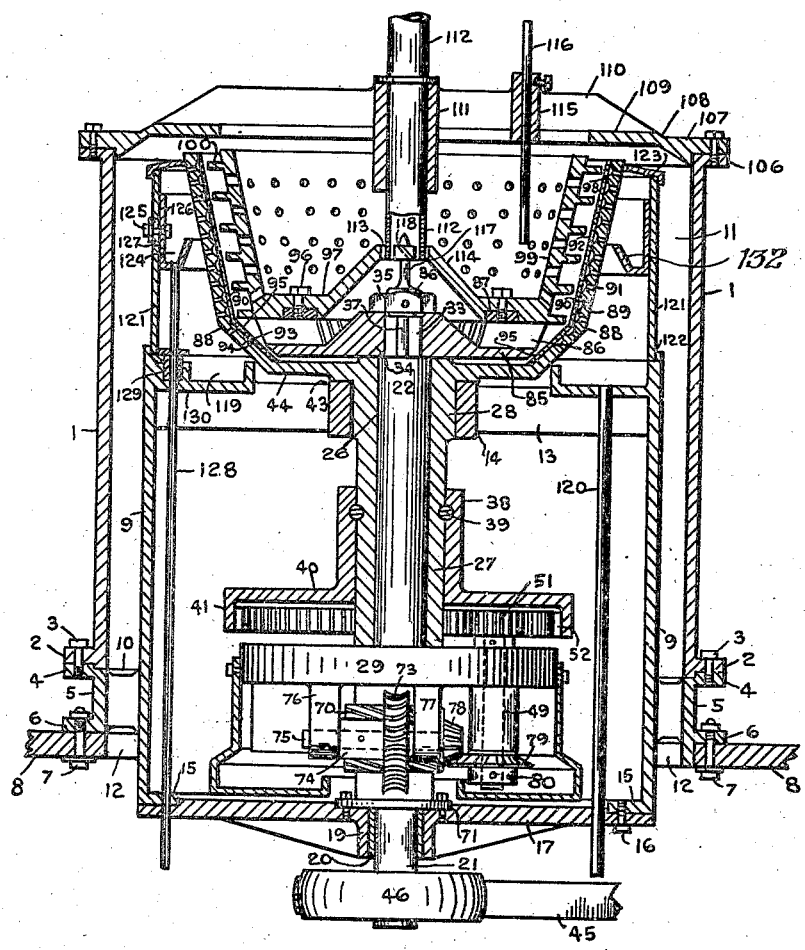

Inventor
Hans C. Behr
By his Attorney

Patented Nov. 29, 1927.

1,650,685

UNITED STATES PATENT OFFICE.

HANS C. BEHR, OF SCARSDALE, NEW YORK.

PROCESS AND APPARATUS FOR SEPARATING LIQUIDS FROM SOLIDS.

Application filed December 12, 1925. Serial No. 74,932.

The invention relates to the centrifugal separation of liquid from granular or other solid material in a continuous manner and comprises a process and means for performing such work.

The continuous centrifuge herein described is of the type in which the material treated is supplied at one portion of the periphery of a rotating cylindrical or conical screening surface and is conveyed across said surface and discharged at the other end thereof by means preferably rotating at a different rate from said screen.

One object of the improvements is to reduce the chance of fine solid material escaping through the screen with the separated liquid. Another object is to secure even distribution of the material during its conveyance across the screen. A further important object has to do with the toothed gearing required for maintaining the relative movement of the screening and conveying means by reducing the speed of the teeth under heavy pressure and reducing the pressure on teeth required to run at high speed, thereby reducing wear and noise of gearing.

The improvements are illustrated in the accompanying drawings in which

Figure 1 is a sectional elevational view of a vertical axis machine with conical screen basket according to my invention;

Figure 4:
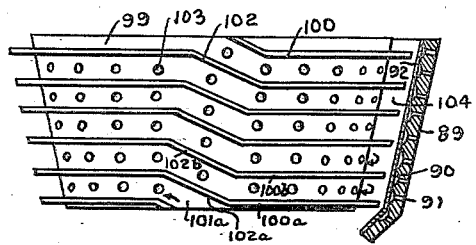
Figure 4 is an elevational view of the conveying member shown in section in Figure 1, with a section of the separating member shown at one side.
Figure 3:
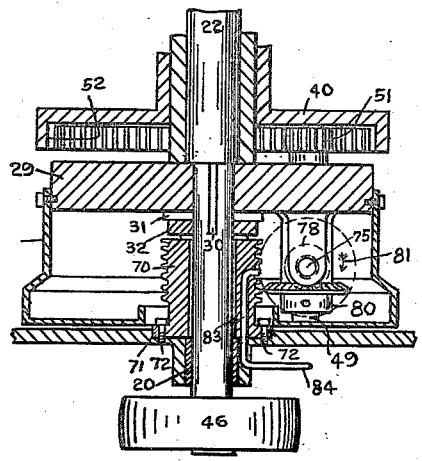
Fig. 3 is a sectional elevational view of the gearing shown in Figures 1 and 2 taken at right angles to the section of Figure 1.

Referring to Figure 1, 1 is the stationary casing of the machine, which serves as a general support for the rotating and fixed parts and at the same time forms the outer shell for the solid products receiver. Its usual flange 2 is secured by bolts 3 to the upper flange 4 of the ring 5, the lower flange 6 of which is held by bolts 7 to the floor 8. The inner shell 9 is integral with ring 5 through a number of ribs 10, affording a space 11 between shells 1 and 9 for the downward passage of the solid product past ribs 10 and through the circular opening 12 in the floor 8. Ribs 13 inside shell 9 support the upper central bearing 14. At its lower end, somewhat below the level of ring 5, shell 9 has an inward flange 15, to which the bolts 16 secure the circular base plate 17. At the center of plate 17 the hub 19 carries the bearing 20 for the lower end 21 of the central shaft 22. The large part of shaft 22 is supported for its full length by the bearing 26 formed by the quill 27, which in turn is supported at its upper enlarged end 28 in the fixed bearing 14 before described.

To the lower part 21 of the shaft 22, and abutting against the large part of the shaft the disc 29 is secured against rotation by feather 30 and in an axial direction by the cotter pin 31 passing through the hub 32 of disc 29. The upper reduced end 33 of shaft 22 has fixed to it the conical hub 34, held against the top of 22 by nut 35 on the threaded end 36 of 22, the feather 37 preventing rotative slipping. Quill 27 abuts with its upper end against the lower face of hub 34 and with its lower end against the upper face of disc 29. The sleeve 38, fixed to quill 27 by the cotter pins 39, is integral at its lower end with the disc 40 and its peripheral ring part 41. The weight of shaft 22 and quill 27 with all their attached parts, which constitute the rotating members, is here shown to be carried by the upper face of the bearing 14, abutting against the lower face 43 of disc 44 fixed to the quill 27. Such support may, however, be provided by thrust bearings or footsteps at any other convenient point of quill 27 or of shaft 22.

The belt 45 on pulley 46, fixed to the lower end 21 of shaft 22, serves to impart a high speed of rotation to the latter and its connected parts, and indirectly drives the quill 27 and its attached parts at a speed slightly faster than its own through the system of gearing now to be described.

Concentric with the axis of the rotating parts, and located just above the bearing 20, with which it may be integral, is the fixed worm 70.

Figure 2:
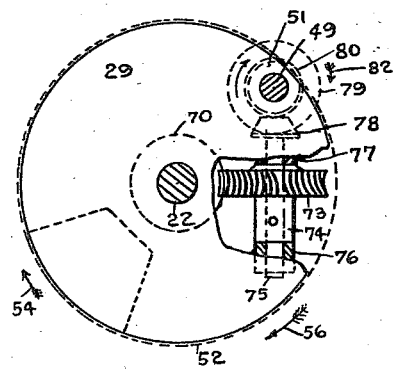
Fig. 2 is a plan view of the lower part of the gear arrangement shown in Figure 1, part of the upper member being shown broken away to show parts beneath.

In the partial plan view Fig. 2 part of disc 29 is shown broken away to give a view of parts beneath it. Worm 70 is fixed truly coaxial with shaft 22 on the base plate 17, being secured in place through its basal flange 71 by screws 72. The worm 70 preferably has multiple threads to obtain the most favorable speed and pressure relations, and its threads mesh with the teeth of worm gear 73, fixed, with its hub 74, to the shaft 75, rotating in the hanger bearings 76 and 77 secured to the lower face of disc 29. Fixed on the shaft 75 and projecting beyond bearing 77 is the bevel pinion 78, meshing with the bevel gear 79, fixed, with its hub 80, to the lower end of the vertical shaft 49 mounted in the disc 29. The pinion 51 is secured to the upper end of shaft 49 and engages with the internal gear 52. In order to cause quill 27 to rotate ahead of shaft 22 with the arrangement of gearing shown, the fixed worm 70 must have left hand helices, in which case the directions of rotation of the various gears will be as indicated by the arrow 54 for disc 29, by arrow 81 for worm gear 73 and bevel pinion 78, by arrow 82 for bevel gear 79 and spur pinion 51, and arrow 56 for the relative rotation of internal gear 52. The worm gear 73 has its teeth lubricated from the fixed worm 70, which for this purpose is provided with the oil passage 83, supplied with oil from the pipe 84.

Obviously the method of gearing described may be varied as to types of gearing employed and as to their relative arrangement, but all embodying the fundamental features of this phase of the improvements; a stationary worm element meshing with a gear, the axis of which is rotated at a rapid rate (and is tangent to a circle concentric with the axis of the fixed gear element), by one of a pair of rotating elements of the machine, and a toothed gear element, integral with the gear in mesh with the fixed worm and meshing directly, or through intermediate gearing, with a preferably internal gear connected with the other rotating element of the said pair.

Referring again to Figure 1, the conical hub 34 at the upper end 33 of shaft 22 is extended at its base into the annular disk 85, connected through a multiplicity of impeller blades 86 with the ring 87. The upper enlarged end 28 of the quill 27 is extended to form the disk 44 previously described, which is integral at its outer edge with the cone 88, extending upward to about the level of the top of impeller blades 86 at which point it is joined by the foraminous mantle 89, and which is also proferably conical for most substances treated, but may in some cases be cylindrical. The inner surface of mantle 89 has internal circumferential grooves 90 each of which has numerous holes 91 leading through to the outer surface of said mantle. The inner grooved surface of 98 is overlaid by the screen material 92. In some cases it will be advantageous to have also cone 88 made with grooves 93, perforated with holes 94 and overlaid with screen material 95, all as shown in Figure 1.

On to the ring 87, integral with blades 86, a number of bolts 96 secure the annular disk 97, recessed on the under side to fit over said ring 87. Disk 97 is integral at its inner edge with the central feed cone 114 and at its outer edge with the small end of the conveyor body 99, which is here conical to conform to the shape of screen 92. The conveyor body 99 is provided on its outer surface with a series of circumferential zonal ribs 100, which have gaps 101 at one or more points of their circumference, where they may be connected to each other by the short inclines 102, (see Fig. 4) so that each zonal rib continues into its adjacent rib at one or more points, thus forming one or more continuous zig-zagged ribs extending from one end of cone 99 to the other. For the sake of balanced construction and operation gaps 101 and inclines 102 should be provided at not less than two equally spaced points of the circumference. The inclines 102 operate to advance the material, held on the screen 92 by centrifugal force, from the lower end of said screen to the large end, each particle of the material thus being moved for short intervals between much longer intervals of rest on the screen. If the zonal ribs 100 are not present, the velocity of movement over the screen, imparted to the material treated by the action of inclines 102, is likely to send the said material forward in an indefinite unrestricted manner, even in the case of a cylindrical form of screen. With a conical screen 92 the lateral component of centrifugal force due to the conical form will aggravate the said uncertainty of forward movement. Serious unbalance of the operating machine is likely to result from the uncertainty of progress of the material over the screen, which is prevented by the zonal ribs 100. If a cylindrical form of screen be used the lateral component of centrifugal acceleration is absent and the zonal ribs 100 need extend only a sufficient distance from the trailing end of the inclines to prevent the kinetic energy imparted to the material from carrying it beyond the intended limits of its periodical forward movement.

The conveyer mantle 99 is perforated between the ribs 100 by numerous holes 103 to permit of air entering the spaces 104 between screen 92 and cone 99, thereby facilitating the expulsion of liquid through screen 92. Where it is desirable to have a more vigorous flow of air, fan blades may, if desired, be attached to the inner surface of cone 99, as set forth in U. S. Patent 1,336,722, issued to H. C. Behr, April 13, 1920.

Figures 5, 7, 8:
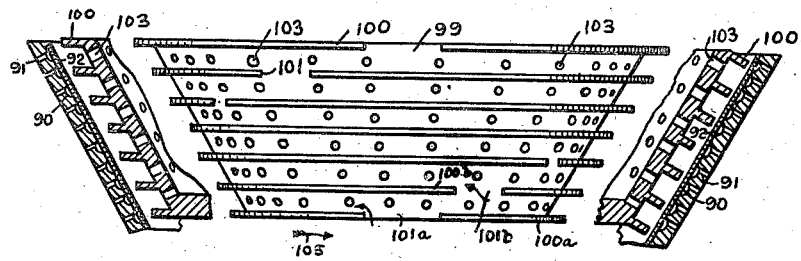
Figure 5 is an elevational view of a modified form of the conveying means.
Figure 7 is an elevational section of one edge of the conveyer shown in Figures 5 and 6.
Figure 8 is an elevational section of one edge of a modified form of the type of conveyer shown in Figures 5 and 6.
Figure 6:
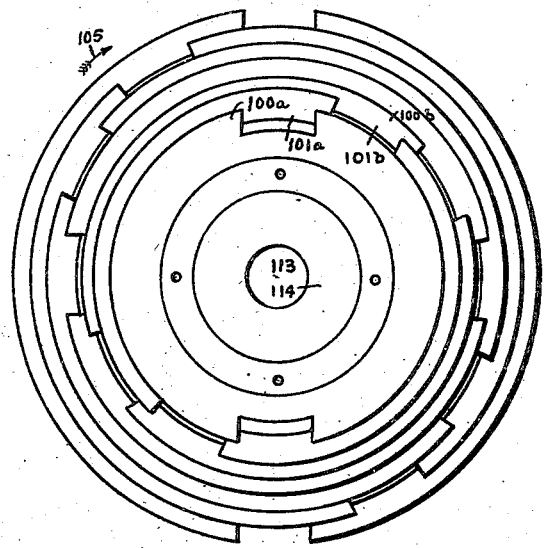
Figure 6 is a plan view, looking at the under side of the member shown in Figure 5.

The advance of material treated over the screen 92 may be accomplished without the aid of inclines 102, as indicated by the conveyer design shown in Figures 5 to 8, where the slope of the screen 92 is such, that the lateral component of centrifugal force, acting along the slope of said screen, is alone sufficient to overcome the frictional resistance of the material on the screen and the scraping action of the incline is not required. At the same time, if the inclines are to be dispensed with, the gaps 101 must not be even approximately in line along the slope of the cone, so that material does not rush at once over the entire width of the screen 92 and discharge at the large end, without having been exposed sufficiently long to centrifugal action to complete the separating process. Figures 5 and 6 show the relative positions of the gaps 101 in the series of ribs 100, which latter act to maintain the said material in position on the screen for a period long in comparison with the period of flow. Thus, for rotation of cone 99, relative to screen 92, in the direction of arrow 105, the material entering at the gap 101ª in first rib 100ª at the small end of cone 99 would be stopped in its further flow by the second rib 100ᵇ, and since the gap 101ᵇ is located ahead of the gap 101ª in the first rib, the material which has entered must remain at rest on the screen until said gap in the second rib, or preferably a diametrically opposite gap, comes around by relative rotation. In this manner the material treated is caused to flow for a short period and to rest on the screen for a many times longer period alternately as many times as there are ribs 100 on the conveyer cone 99, until its final discharge through the last gap at the large end of said cone.

The ribs 100 may, if desired, be formed like a plane ring, as shown, or they may have their cross section normal to the slope of cone 99 or at any other desired inclination, depending on the character of the material treated and other factors.

The cylindrical frame shell 1 is provided at its upper end with the flange 106, to which is bolted the annular cover plate 107, conical at 108, where it abuts against shell 1, and having a horizontal inner portion 109, across which extends the girder 110 with the boss 111 at the center. Boss 111 is bored to hold the fixed material supply pipe 112, which extends down through the central opening 113 of the rotating distributing cone 114, previously described. At one side of girder 110 there is another boss 115, bored to hold the wash water supply pipe 116.

Into the lower end of the fixed material supply pipe 112 there extends from the upper end 36 of shaft 22 the small spindle 117, having at its upper end, within the mouth of supply pipe 112, the small propeller 118, the purpose of which is to cause equality of outward flow of material around the mouth of said supply pipe.

Around the top of the inner frame shell 9 there is provided the inward annular basin 119 for catching the pure liquor expelled through the lower part of the foraminous separating cone 89, which liquor is led away through the pipe 120, extending down through the bottom plate 17. The inner shell 9 is continued upward to near the level of the top of cone 89 by the lighter shell 121, set into the grooves 122 in the top edge of shell 9 and provided with the annular conical cover 123, surrounding and slightly below the top edge of separating cone 89.

Inside the shell 121 there is secured the annular trough 124 for receiving the separated liquid diluted with wash water, issuing through the upper part of foraminous cone 89. Trough 124 is free to slide within the shell 121, but is secured thereto in vertical adjustment by a number of bolts 125, passing through its outer higher wall 126 and through slots 127 in shell 121. The washings caught in trough 124 are carried off by the pipe 128, extending down through a packing 129 in the bottom 130 of basin 119 and through the basal flange 15 of shell 9 and the base plate 17.

The operation of the machine is as follows. Power having been applied by pulley 46, to shaft 22, the foraminous mantle 89 is rotated with high speed at a slightly faster rate, not exceeding 20 per cent faster, and in most cases only a fraction of 1 per cent faster, than the conveyer cone 99, as will be clear from the previous description, its speed being that of 29, carrying 49, plus the individual rotation of 40.

With the machine running in the manner described, material to be treated is admitted through the stationary feed pipe 112, and as it approaches the mouth of said pipe the small propeller 118, rotating with the machine, ensures an equal distribution of the material, at the same time imparting rotary motion to it, so that centrifugal force drives it outward, as it issues from the pipe, against the small upper end of the inner surface of cone 114, where frictional contact with said surface aids in driving the material towards its large lower end. At the same time any remaining inequality in the depth of the layer of material is evened up by its coming hydrostatically to a true surface of rotation through the influence of centrifugal force, so that it enters in equal amounts between the impeller blades 86. Unbalancing of the machine through uneven distribution of the material under treatment is thus avoided. The blades 86 now impel the material more positively outward and against the inner surface of cone 88, which has sufficient inclination, so that the resulting lateral component of centrifugal force drives the material upward against the lowest rib 100ª of the conveyer 99, where most of the material is temporarily retained by said rib, while a small fraction thereof is permitted to pass further upward.

While the material is being moved upward over the screens 95 and 92 in the manner described, its liquid constituent is being expelled outward by centrifugal force through said screens and the holes 94 and 91. The pure undiluted liquor expelled during the first or purging stage of separation through screen 95 and the lower part of screen 92 strikes against the inner surface of shell 121 and flows down into catch basin 119, from which it drains away through pipe 120. The great bulk of the liquid constituent will generally have been forced from the material some time before it has completed half of its forward path on the screens, but there will remain films of liquid adhering tenaciously to the solid grains, which films can only be removed by spraying with water or other liquid while the material is under centrifugal action. In the present case a spray is continuously applied from pipe 116 at the upper part of screen 92, and the resulting dilute liquor, passing outward through screen 92 and holes 91, is caught in the annular trough 124, from which it drains away through pipe 128. Trough 124 is made vertically adjustable within shell 121, as previously described, to adapt the position of its inner lip 132 to the most favorable level of division between the zones of discharge for the pure and diluted liquors.

The dehydrated solids centrifugally discharged over the upper edge of mantle 89 fly outward against the sloping surface 108 of the cover plate 107 and are thereby diverted downward into the annular space 11 between frame shells 1 and 9, from which space they fall out through the opening 12 in the floor 8.

Access to screens 92 and 95, when the machine is at rest, is obtained by removing the cover plate 107 with feed tube 112, unscrewing bolts 96, which hold in place the bottom disk 97 of conveyer cone 99, and lifting out said conveyer.

While the machine described and illustrated is designed for the discharge of solids at the upper edge of the screen 92, which is the preferred arrangement for most cases, the improvements may obviously also be applied to other forms, as for example to an inverted arrangement of screen with the material fed in at the upper edge and discharged at the lower edge, or to a machine having a horizontal or an inclined axis instead of a vertical one.

It will now be clear from the foregoing that for separating liquid from material consisting of a mixture of liquid with solid material there is provided a centrifugal machine, in which the progress of the said material over the separating screened element is controlled in a definitely measured out and restricted manner by means of zonal ribs forming part of the conveying member and having short gaps while at the same time the period during which such progress takes place, through said gaps, is very short in comparison with the period during which the material remains at rest on the screens between the said zonal ribs; that by such arrangement the wear of the screen and the escape of fine solid material through the screen with the separated liquid are very much reduced; that the necessary small difference in speed between the high speed relatively rotating members, comprising the separating and conveying members, is effected by means of a non-rotating worm coaxial with the axis of the machine and engaging with and causing rotation of a worm gear about its own axis, while said axis is rotated at high speed about the axis of said non-rotating worm; that said rotating gear is integral with a second toothed member engaging directly or indirectly at slow speed and higher pressure with a gear member secured to one of said slightly relatively rotating high speed members, or integral therewith, and that coarse pitch teeth can be used for high pressure slow speed gearing and fine pitch teeth for the high speed low pressure gearing, that by the described arrangements the wear and noise of gear teeth are very much reduced.

I do not confine myself to the special details of construction herein disclosed for attaining the above described ends. Modifications embodying the features described will be obvious to those skilled in the art.

I claim.

1. In an apparatus for continuously separating liquid from solid material by centrifugal force, a foraminous shell mounted for continuous rotation about its axis, controlling mechanism within and coaxial with said shell independently mounted to rotate at a different speed, a fixed worm coaxial with said shell, and gearing actuated by engagement with said worm operatively connected with said shell and adapted to maintain a slight difference of speed between said shell and said controlling mechanism.

2. In an apparatus for continuously separating liquid from solid material by centrifugal force, a foraminous shell mounted for continuous rotation about its axis, controlling mechanism within and coaxial with said shell independently mounted to rotate at a different speed, a fixed worm coaxial with said shell, and gearing actuated by engagement with said worm operatively connected with said shell and adapted to maintain a slight difference of speed between said shell and said controlling mechanism, said gearing comprising an annular rack coaxial with and in fixed relation to said shell and an intermediate gear revolving about the common axis and rotating on its own axis.

3. In an apparatus of the character described, a pair of concentric high speed members, one within the other, one for separating and the other for conveying materials, one rigid with a shaft at one end and the other rigid with a sleeve coaxial with said shaft, a common means for rotating both members and mechanism comprising a fixed worm gear interposed between said common rotating means and one member for varying its speed.

4. In an apparatus for continuously separating liquid from solid material by centrifugal force, a foraminous circular shell rotating continuously about its axis, a controller within and coaxial with said shell, rotating at a slightly different speed, a series of zonal ribs on said controller having each a gap and means to prevent material moving longitudinally of said shell more than the distance between one of said ribs and the next in one movement.

5. In an apparatus for continuously separating liquid from solid material by centrifugal force, a foraminous circular shell rotating continuously about its axis, a controller within and coaxial with said shell rotating at a slightly different speed, a series of zonal ribs on said controller having each a gap and means to prevent material moving longitudinally of said shell more than the distance between one of said ribs and the next in one movement, said means comprising an inclined member extending from a point adjacent the edge of one gap to the next rib.

6. In an apparatus for continuously separating liquid from a mixture of solid and liquid material by centrifugal force while conveying said material from one end to the other of the inner surface of a rapidly rotating foraminous shell by a conveying means rotating at a slightly different speed than said shell, toothed gear operating means for producing said difference in rotation of said shell and said conveying means, consisting of a fixed non-rotating toothed element coaxial with the axis of the machine, a toothed gear in mesh with and rotated by said toothed element about an axis and rotating about the axis of said element, a second toothed element rigid with said toothed gear and adapted to drive a gear rigid with one of said shells and said conveying means.

7. In an apparatus of the character described, a pair of concentrically rotating high speed members one within the other, having a slight difference in speed, the outer of said members being a foraminous shell adapted to separate liquid from solid material, and means with which the inner member is provided to effect and control the progress of said material towards its discharge and over the surface of the outer member longitudinally and laterally and to detain it successively in longitudinal zones.

8. The combination of a plurality of spaced concentric cylindroid members mounted for rotation, means for feeding fluent material containing a liquid and solids to the space between said members, projecting members on the outer surface of the inner of said first-named members projecting substantially in the plane of rotation thereof across said space, said last-named members having apertures therein leading in a direction angular to said plane of rotation.

9. The combination of a plurality of spaced concentric cylindric members mounted for rotation, means for feeding fluent material containing a liquid and solids to the space between said members, projecting members on the outer surface of the inner of said first-named members projecting substantially in the plane of rotation thereof across said space, said last-named members having apertures therein leading in a direction angular to said plane of rotation and inclined members extending from one of said projections adjacent the opening of the aperture to an imperforate portion of the next.

10. The process of separating liquids and solids centrifugally and continuously which consists in moving a fluid containing both in a substantially vertical direction in a thin sheet and simultaneously rotating the same, and holding it at successive zones in its vertical movement while causing it to flow laterally in the zones and subjecting it to the action of a screen exterior thereto and a scraping action along said screen.

11. The herein described process of separating liquid and solids in a fluid containing both centrifugally and continuously, which consists in rotating the said fluid while it is held in a relatively thin annular sheet between two concentric walls and causing it to pass outwardly through screening elements of the outer wall by centrifugal force and simultaneously causing the same to move laterally over said outer wall and vertically thereof at intervals only, the periods of lateral movement being greater in duration than the periods of vertical movement.

12. A plurality of spaced substantially concentric members, means for rotating the same at a slightly different speed of rotation, means for distributing a fluid containing liquid and solids to one portion of the space between said members, circumfential projections extending from the exterior of one of said members into said space and into proximity with the inner surface of the outer member, said outer member being foraminous to permit the passage of liquid therethrough, and said projections being spaced longitudinally of the inner member and having openings therethrough to permit the longitudinal movement of fluid in said space in a direction away from the portion of the space to which it is admitted and laterally along the spaces between said projections, said openings constructed and arranged to permit longitudinal movement of the fluid from one said circumferential space to another only after it has moved laterally through one of said spaces.

13. In a device of the character described a plurality of foraminous concentric spaced coaxial members, means for admitting fluid to the space between said members and for permitting the escape of liquid and solids therefrom in different directions, and means for causing one of said members to rotate at a higher speed than the other while actuated from a common source of power, said means comprising a shaft, direct connections between said shaft and both members whereby the rotation of said shaft is communicated thereto, a fixed gear member, an intermediate gear member engaging said fixed gear member and rotating thereon with said shaft, and intermediate gears connecting said gear member which rotates with the shaft with one of said first-named members whereby its rotation is imparted to said first-named member to give it added speed of rotation.

14. The process of separating liquids and solids centrifugally and continuously which consists in confining the fluid in an annular space between two rapidly rotating concentric members, causing it to pass by centrifugal force through fine openings in the outer member, and simultaneously causing the said fluid to move laterally around the said space and longitudinally thereof in successive stages while maintaining the supply of fluid to the said space, and then causing the separated solids to pass from said space near one end thereof.

15. In a centrifuge the combination of two concentric foraminous members spaced apart to provide an annular channel for the fluid to be separated and means for causing one of said members to rotate at a slightly greater speed than the other, comprising a shaft, a source of power connected with said shaft, connections between said shaft and said members whereby its rotation is imparted to them, a gear member disconnected from said shaft and gears operatively connected with said gear member and with one of said concentric members whereby rotation of said gears with the shaft causes additional rotation of the concentric member with which they are connected, the said gear member having its teeth angular to the axis of rotation of the gear which engages therewith.

16. In a device of the character described, the combination with two concentrically arranged foraminous members, mounted to be rotated from a common source of power, of a common drive shaft connected therewith, a fixed worm gear, an internal rack member connected with one of said foraminous members and mounted to have rotation relative to the other, and gears intermediate said rack and fixed worm gear, whereby rotation of said rack with its foraminous member causes accelerated rotation thereof through its connection with the worm gear.

Witness my hand this 27th day of November, 1925, at the city of New York, State of New York, county of New York.

HANS C. BEHR.